E. KUHNS.
GRAIN-DRILL.
No. 176,967. Patented May 2, 1876.
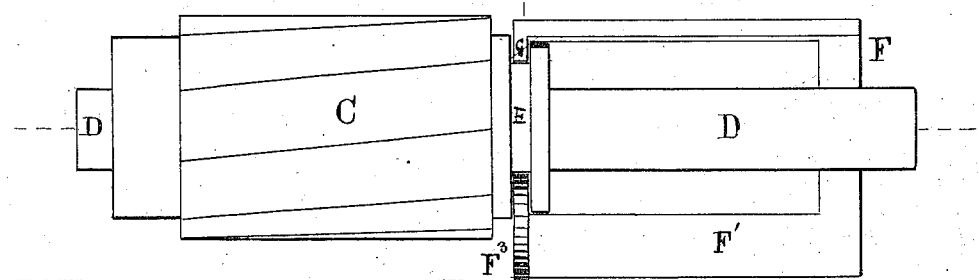
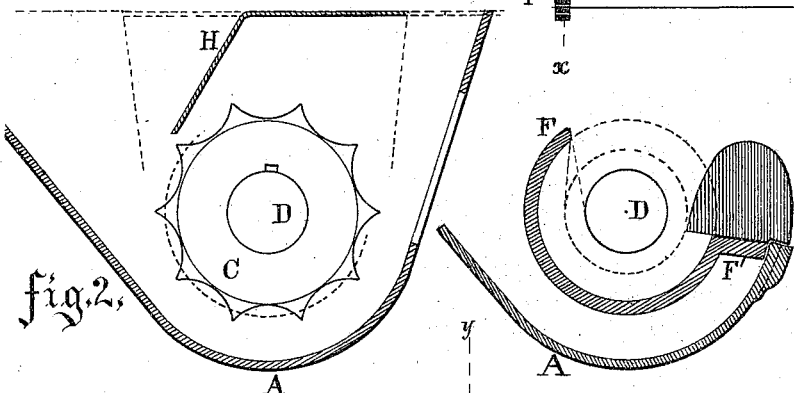
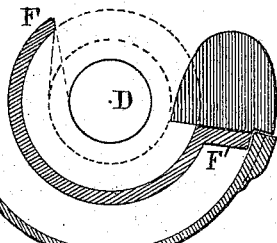
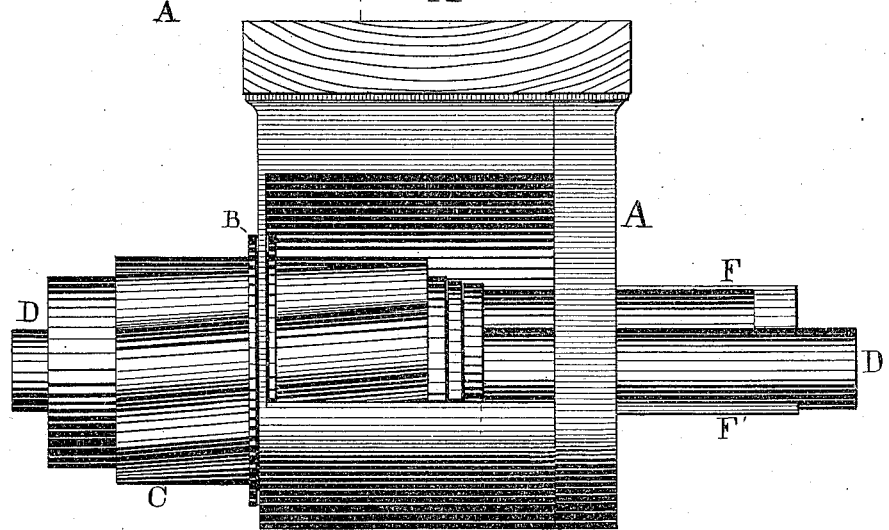
Attest
C. M. Connell
E. A. Bulby
Inventor
Edward Kuhns
Per Blanchard & Singleton
Attys.

UNITED STATES PATENT OFFICE.

EDWARD KUHNS, OF LOGANSPORT, INDIANA, ASSIGNOR OF ONE-HALF HIS RIGHT TO BENJAMIN KUHNS, OF DAYTON, OHIO.

IMPROVEMENT IN GRAIN-DRILLS.

Specification forming part of Letters Patent No. 176,967, dated May 2, 1876; application filed December 30, 1875.

*To all whom it may concern:*

Be it known that I, EDWARD KUHNS, of Logansport, in the county of Cass and State of Indiana, have invented certain new and useful Improvements in Grain-Drills; and I do hereby declare that the following is a full, clear, and exact description thereof, which will enable others skilled in the art to which it pertains to make and use the same, reference being had to the accompanying drawings, and to the letters of reference marked thereon, which form a part of this specification—

Figure 1 being a plan view of the feed-wheel and its shaft and the sliding grain-regulator; Fig. 2, a sectional elevation on line $y\ y$ of Fig. 4; Fig. 3, a section on line $x\ x$ of Fig. 1; and Fig. 4, a side elevation, showing the seed-cup, the feed-wheel, and its shaft, and also the grain-regulator, the parts being in position with reference to each other.

This invention relates to mechanism for distributing grain from the hoppers of grain-drills; and it consists in the construction and arrangement of certain of the parts of which it is composed, as will be more fully explained hereinafter.

In constructing feed-wheels for grain-drills in which the amount of grain distributed on a given area of ground is controlled by a horizontal movement of said wheels a great difficulty has arisen, owing to the fact that the grain has been allowed to fall in between the end of the wheel and the portion of the cup toward which it is moved, or between the grain-regulator and said cup, as a consequence of which it has been nearly impossible to move the wheel or regulator, and quite so without mashing more or less of the grain, and thus destroying it.

This invention has for its object the remedying of the difficulties alluded to, which is believed to be accomplished by the construction and combination of parts shown and described.

In constructing devices of this character, I use a feed-cup, A, of any suitable size and form that will receive and support the feed-wheel and the grain-regulator. One of the vertical sides of this cup has an annular aperture formed in it for the reception of the rotating collar B, which is made to rotate freely in said aperture. This collar has formed in it an opening of sufficient diameter to admit the passage through it of the feed-wheel, and has upon its interior surface a series of projections formed to enter the cavities between the ribs of said wheel, so that it may be rotated thereby. The opposite vertical plate of the seed-cup has formed in it an aperture, which is so constructed as to permit the shaft which carries the feed-wheels and grain-regulator to pass through it, and be moved therein without allowing any grain to pass out at that point. The feed-wheel C, which is to be used in connection with this cup, is corrugated upon its outer surface, the corrugations to be formed spirally or in a line with its axis, as preferred, and is to be of such a length that when placed in position to deliver the greatest amount of grain the end thereof which passes through the annular collar B shall extend to or beyond its outer surface, and thus prevent the escape of grain, and be at all times in a position to rotate the collar. This feed-wheel is mounted upon a shaft, D, which may extend the entire length of the machine, and carry all of the feed-wheels; or it may be made in sections and coupled together between the cups. To this shaft the feed-wheels are secured, so as to be rotated thereby, and to be moved horizontally therewith or thereon, its inner end being provided with a groove in order that the grain-regulator may be connected thereto and move with it.

The grain-regulator, already alluded to, is lettered F, and is peculiar in construction, it consisting of a plate of segmental form, having attached to it a radially-extending flange, $F^1$, which effectually prevents the regulator from rotating. To the inner end of the radial flange $F^1$ there is attached a projection, $F^3$, which, when the regulator is moved, prevents the grain from falling over into the segmental portion, and also serves to contract or enlarge the delivery aperture for the grain. The inner end of the segmental portion of the regulator is provided with an inwardly-projecting flange, G, which enters into the annular groove E, formed in the feed-wheel C, and aids in uniting the two parts, and it also prevents the grain from passing into the space between the cup and regulator. In order that the grain may be prevented from passing over the feed-wheel, a shield, H, is placed in the cup A, as shown in Fig. 2, it being so arranged as to come nearly in contact with the same, and with the upper edge of the segmental portion of the regulator.

From the description given, and from the drawings, it will be seen that, when it is desirable, the entire length of the wheel can be used for distributing grain; or it may be used in any position between that and the closed position, and thus be made to sow any desired amount of grain upon a given area of ground, and that this may be done without any compression of the grain or breaking thereof.

Having thus described my invention, what I claim, and desire to secure by Letters Patent, is—

1. A seed-cup for grain-drills, one of the vertical plates of which is provided with an annular aperture for the reception of a rotating collar, and the other with an aperture for the segmental passage of the sliding grain-regulator, substantially as and for the purpose specified.

2. The sliding grain-regulator F, having a segmental portion, as described, for the purpose of preventing the grain from falling into the same when the delivery-orifice is diminished, and a projection, $F^3$, for contracting the delivery-orifice, substantially as set forth.

3. The combination, in a grain-drill, of the feed-wheel C, shaft D, and a segmental sliding feed-regulator passing through one of the vertical walls of the seed-cup, substantially as and for the purpose set forth.

4. The combination, in a grain-drill, of a cup, A, having in one of its ends a circular aperture for the reception of a rotating collar, and in the other a segmental aperture for the passage of the grain-regulator, a feed-wheel, C, a shaft, D, and a segmental sliding grain-regulator, the parts being arranged to operate substantially as and for the purpose set forth.

5. The combination, in a grain-drill, of a grooved feed-wheel, a rotating collar adapted to be rotated by said wheel by having projections formed upon its inner surface to fit the depressions in the wheel, a segmentally-formed sliding feed-regulator working through one of the vertical walls of the seed-cup, and a seed-cup, all constructed substantially as and for the purpose set forth.

In testimony that I claim the foregoing as my own invention I affix my signature in presence of two witnesses.

EDWARD KUHNS.

Witnesses:
ALLEN B. DAVIDSON,
DAVID B. GRAHAM.